United States Patent
Karabacak et al.

(10) Patent No.: US 10,153,853 B1
(45) Date of Patent: Dec. 11, 2018

(54) RADIO FREQUENCY DOPPLER SPREAD EMULATORS

(71) Applicant: UNIVERSITY OF SOUTH FLORIDA, Tampa, FL (US)

(72) Inventors: Murat Karabacak, Tampa, FL (US); Huseyin Arslan, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 16/023,826

(22) Filed: Jun. 29, 2018

Related U.S. Application Data

(60) Provisional application No. 62/561,975, filed on Sep. 22, 2017.

(51) Int. Cl.
    *H04B 17/391* (2015.01)

(52) U.S. Cl.
    CPC .................. *H04B 17/391* (2015.01)

(58) Field of Classification Search
    CPC ...... H04B 17/391; H04B 17/21; H04B 17/29; H04B 17/3912
    See application file for complete search history.

(56) References Cited

U.S. PATENT DOCUMENTS

2011/0217937 A1* 9/2011 Cook ................ H04B 17/0085
                                                          455/67.14

OTHER PUBLICATIONS

Bello, "Aeronautical channel characterization," IEEE Trans. Commun., vol. 21, No. 5, pp. 548-563, 1973.

Boutillon et al.,"Design of high speed AWGN communication channel emulator," Analog Integr. Circuits Signal Process., vol. 34, No. 2, pp. 133-142, 2003.

Boutillon et al., "Hardware discrete channel emulator," in Proc. 2010 IEEE Int. Conf. on High Performance Computing & Simulation (HPCS), 2010, pp. 452-458.

Goubran et al., "Implementation of a real-time mobile channel simulator using a DSP chip," IEEE Trans. Instrum. Meas., vol. 40, No. 4, pp. 709-714, 1991.

Guzelgoz et al., "Investigation of time selectivity of wireless channels through the use of RVC," Elseiver J. Meas., vol. 43, No. 10, pp. 1532-1541, 2010.

Huang, "A novel structure for Rayleigh channel generation with consideration of the implementation in FPGA," IEEE Tran. Circuits Syst. II, Exp. Briefs, vol. 63, No. 2, pp. 216-220, 2016.

(Continued)

*Primary Examiner* — Nguyen T Vo
(74) *Attorney, Agent, or Firm* — Michael Best & Friedrich LLP

(57) ABSTRACT

Methods and radio frequency (RF) Doppler emulator circuits for emulating Doppler spread in an RF domain. The RF Doppler emulator circuit includes a power splitter, a signature control circuit, a first variable attenuator, a second variable attenuator, and a power combiner. The power splitter is configured to receive an RF input signal and generate a first signal and a second signal using the RF input signal. The signature control circuit is configured to generate a third signal using the first signal. The signature control circuit is further configured to generate a fourth signal using the second signal. The first variable attenuator is configured to generate a fifth signal using the third signal. The second variable attenuator is configured to generate a sixth signal using the fourth signal. The power combiner is configured to generate an RF output signal by combining the fifth signal and the sixth signal.

11 Claims, 9 Drawing Sheets

(56) References Cited

OTHER PUBLICATIONS

Karabacak et al., "RF domain channel emulation techniques with SAW filters," in Proc. 2013 Wireless Inn. Forum Conf. on Commun. Technol. and Softw. Defined Radio (WInnComm), 2013.

Komninakis, "A fast and accurate Rayleigh fading simulator," in Proc. 2003 IEEE Global Telecommun. Conf. (GLOBECOM), 2003, pp. 3306-3310.

Li et al., "The real-time simulation of doppler spread in wireless mobile environment by RF circuits," Chinese J. Electron., vol. 24, No. 4, pp. 837-843, 2015.

Mar et al., "Design of softwaredefined radio channel simulator for wireless communications: Case study with DSRC and UWB channels," IEEE Trans. Instrum. Meas., vol. 58, No. 8, pp. 2755-2766, 2009.

Olmos et al., "Design and implementation of a wide-band real-time mobile channel emulator," IEEE Trans. Veh. Technol., vol. 48, No. 3, pp. 746-764, 1999.

Sorrentino et al., "On the coherence time control of a continuous mode stirred reverberating chamber," IEEE Trans. Antennas Propag., vol. 57, No. 10, pp. 3372-3374, 2009.

Stephenne et al., "Effective multi-path vector channel simulator for antenna array systems," IEEE Trans. Veh. Technol., vol. 49, No. 6, pp. 2370-2381, 2000.

Sutton et al., "Satellite-aircraft multipath and ranging experiment results at L band," IEEE Trans. Commun., vol. 21, No. 5, pp. 639-647, 1973.

Yang et al., "Correlated fading channel simulator based on the overlap-save method," IEEE Trans. Wireless Commun., vol. 12, No. 6, pp. 3060-3071, 2013.

\* cited by examiner

RADIO FREQUENCY DOPPLER SPREAD EMULATORS

RELATED APPLICATIONS

This application claims priority to U.S. Provisional Application No. 62/561,975, entitled "RADIOFREQUENCY CIRCUIT FOR REAL-TIME FREQUENCY/DOPPLER SPREAD EMULATION," filed Sep. 22, 2017, the entire contents of which is incorporated herein by reference.

FIELD

The disclosure relates to radio frequency (RF) Doppler spread emulation methods and emulators circuits.

SUMMARY

On-site signal measurements provide reliable and realistic results for evaluation of prototype devices. However, such measurements may be time consuming and costly to execute. For example, on-site signal measurements for air to ground communication require the use of an airplane. In order to mitigate these challenges, measurement instruments that generate desired environmental channel effects (for example, time dispersion, frequency dispersion, and additive noise) are widely utilized as channel emulators to facilitate affordable evaluation and verification tools in laboratory environments. Examples of channel emulators include baseband emulators and reverberation chambers. However, baseband emulators require the radio frequency (RF) signal input to be down-converted, digitized, processed, and then up-converted again. Thus, baseband emulators introduce high processing delays on top of their complex structure and high cost. Further, reverberation chambers only provide limited control of the channel. A channel emulator that is compact, easy to control, and capable of measuring signal characteristics under frequency dispersive channel conditions is needed.

Thus, the disclosure provides RF Doppler emulator circuits including variable attenuators, RF switches, power combiners, and power splitters. The RF Doppler emulator circuits implement channel variation in the RF domain by manipulating the attenuation and switching between RF paths with different phases. Therefore, the input RF signal does not need to pass through a costly conversion process into and out of the digital domain, as is the case with baseband emulators. The RF Doppler emulator circuits introduce, among other things, Doppler spread (one of the channel effects) of air to ground channels. The RF Doppler emulator circuits provide low-cost and real-time solutions with small form factors. In some embodiments, the RF Doppler emulator circuits implement both time and frequency dispersion in the RF domain.

The disclosure also provides an RF Doppler emulator circuit that, in one embodiment, includes a power splitter, a signature control circuit, a first variable attenuator, a second variable attenuator, and a power combiner. The power splitter is configured to receive an RF input signal. The power splitter is also configured to generate a first signal using the RF input signal. The power slitter is further configured to generate a second signal using the RF input signal. A first phase difference between the second signal and the first signal is 90 degrees. The signature control circuit is configured to generate a third signal using the first signal. A second phase difference between the third signal and the first signal is either zero degrees or 180 degrees. The signature control circuit is further configured to generate a fourth signal using the second signal. A third phase difference between the fourth signal and the second signal is either zero degrees or 180 degrees. The first variable attenuator is configured to generate a fifth signal using the third signal. A signal strength of the fifth signal is less than a signal strength of the third signal. The second variable attenuator is configured to generate a sixth signal using the fourth signal. A signal strength of the sixth signal is less than a signal strength of the fourth signal. The power combiner is configured to generate an RF output signal by combining the fifth signal and the sixth signal.

The disclosure further provides a method for emulating Doppler spread in an RF domain. In one embodiment, the method includes receiving an RF input signal at a power splitter. The method also includes generating, with the power splitter, a first signal using the RF input signal. The method further includes generating a second signal by shifting a phase of the RF input signal by 90 degrees with the power splitter. The method also includes generating a third signal by shifting a phase of the first signal by either zero degrees or 180 degrees. The method further includes generating a fourth signal by shifting a phase of the second signal by either zero degrees or 180 degrees. The method also includes generating a fifth signal by attenuating a signal strength of the third signal with a first variable attenuator. The method further includes generating a sixth signal by attenuating a signal strength of the fourth signal with a second variable attenuator. The method also includes generating an RF output signal by combining the fifth signal and the sixth signal with a power combiner.

The disclosure also provides an RF Doppler emulator circuit that, in one embodiment, includes an RF switch, a power combiner, and a variable attenuator. The power combiner includes a first input port and a second input port. The RF switch is configured to receive an RF input signal. The RF switch is also configured to rout the RF input signal to either the first input port or the second input port. The power combiner is configured to generate a first signal using the RF input signal. A first phase difference between the first signal and the RF input signal is zero degrees when the RF switch routs the RF input signal to the first input port. The first phase difference between the first signal and the RF input signal is 180 degrees when the RF switch routs the RF input signal to the second input port. The variable attenuator is configured to generate an RF output signal using the first signal. A signal strength of the RF output signal is less than a signal strength of the first signal.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
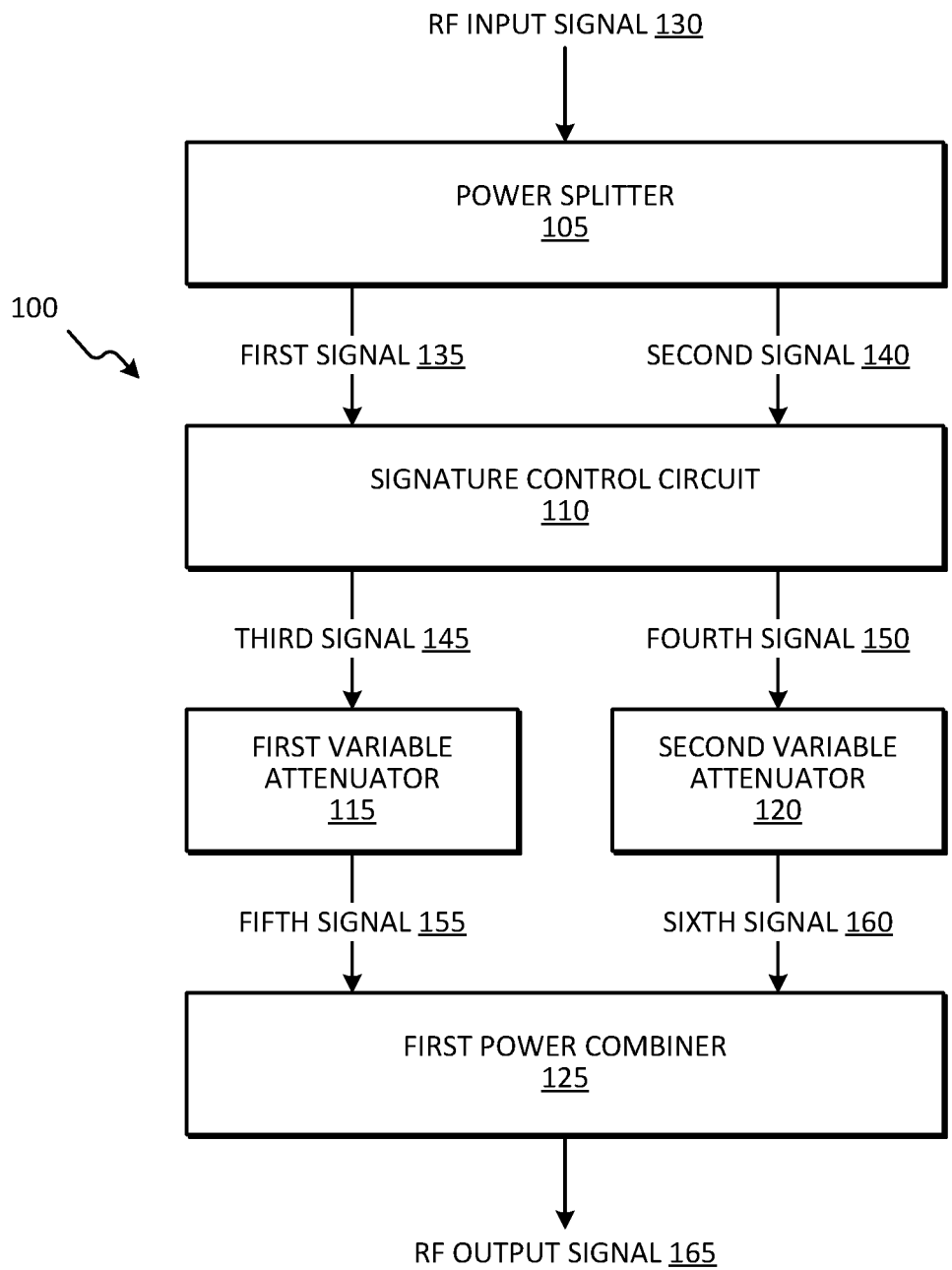
FIG. 1 is a diagram of a radio frequency (RF) Doppler emulator circuit, in accordance with some embodiments.

FIG. 1 is a diagram of one example embodiment of a radio frequency (RF) Doppler emulator circuit 100. In the embodiment illustrated in FIG. 1, the RF Doppler emulator circuit 100 includes a power splitter 105, a signature control circuit 110, a first variable attenuator 115, a second variable attenuator 120, and a first power combiner 125. The RF Doppler emulator circuit 100 illustrated in FIG. 1 is provided as one example of such a circuit. In some embodiments, the RF Doppler emulator circuit 100 includes fewer or additional components in configurations different from the one illustrated in FIG. 1.

The power splitter 105 receives an RF input signal 130 (for example, x(t)). The power splitter 105 generates a first signal 135 and a second signal 140 using the RF input signal 130. The power splitter 105 generates the first signal 135 such that the phase of the first signal 135 (for example, a first phase) is nearly the same as the phase of the RF input signal 130. The power splitter 105 generates the second signal 140 such that the phase of the second signal 140 (for example, a second phase) is shifted 90 degrees from the phase of the first signal 135. In other words, the power splitter 105 may divide the RF input signal 130 into a first signal 135 representing a real path (for example, x(t)) and a second signal 140 representing an imaginary path (for example, x(t)·exp(j0.5π)). In some embodiments, the power splitter 105 includes a two-way 90 degree power splitter (for example, the QCS-152+ two-way 90 degree power splitter from Mini-Circuits™).

The signature control circuit 110 is connected to the power splitter 105 such that the signature control circuit 110 receives the first signal 135 and the second signal 140. The signature control circuit 110 generates a third signal 145 using the first signal 135. In some embodiments, the signature control circuit 110 generates the third signal 145 by shifting the phase of the first signal 135 either zero degrees or 180 degrees. The signature control circuit 110 also generates a fourth signal 150 using the second signal 140. In some embodiments, the signature control circuit 110 generates the fourth signal 150 by shifting the phase of the second signal 140 either zero degrees or 180 degrees.

The first variable attenuator 115 is connected to the signature control circuit 110 such that the first variable attenuator 115 receives the third signal 145. The first variable attenuator 115 generates a fifth signal 155 using the third signal 145. In some embodiments, the first variable attenuator 115 generates the fifth signal 155 by attenuating the signal strength of the third signal 145. For example, the first variable attenuator 115 generates the fifth signal 155 such that the signal strength of the fifth signal 155 is less than the signal strength of the third signal 145. In some embodiments, the first variable attenuator 115 includes a voltage controlled attenuator (for example, the RFSA2013 voltage controlled attenuator from RFMD™).

The second variable attenuator 120 is connected to the signature control circuit 110 such that the second variable attenuator 120 receives the fourth signal 150. The second variable attenuator 120 generates a sixth signal 160 using the fourth signal 150. In some embodiments, the second variable attenuator 120 generates the sixth signal 160 by attenuating the signal strength of the fourth signal 150. For example, the second variable attenuator 120 generates the sixth signal 160 such that the signal strength of the sixth signal 160 is less than the signal strength of the fourth signal 150. In some embodiments, the second variable attenuator 120 includes a voltage controlled attenuator (for example, the RFSA2013 voltage controlled attenuator from RFMD').

The first power combiner 125 is connected to the first variable attenuator 115 such that the first power combiner 125 receives the fifth signal 155. The first power combiner 125 is also connected to the second variable attenuator 120 such that the first power combiner 125 receives the sixth signal 160. The first power combiner 125 generates an RF output signal 165 using the fifth signal 155 and the sixth signal 160. For example, the first power combiner 125 combines the fifth signal 155 and the sixth signal 160 to generate the RF output signal 165. In some embodiments, the first power combiner 125 includes a two-way zero degree power combiner (for example, the GP2S+ two-way zero degree power splitter/combiner from Mini-Circuits™).

Figure 2:
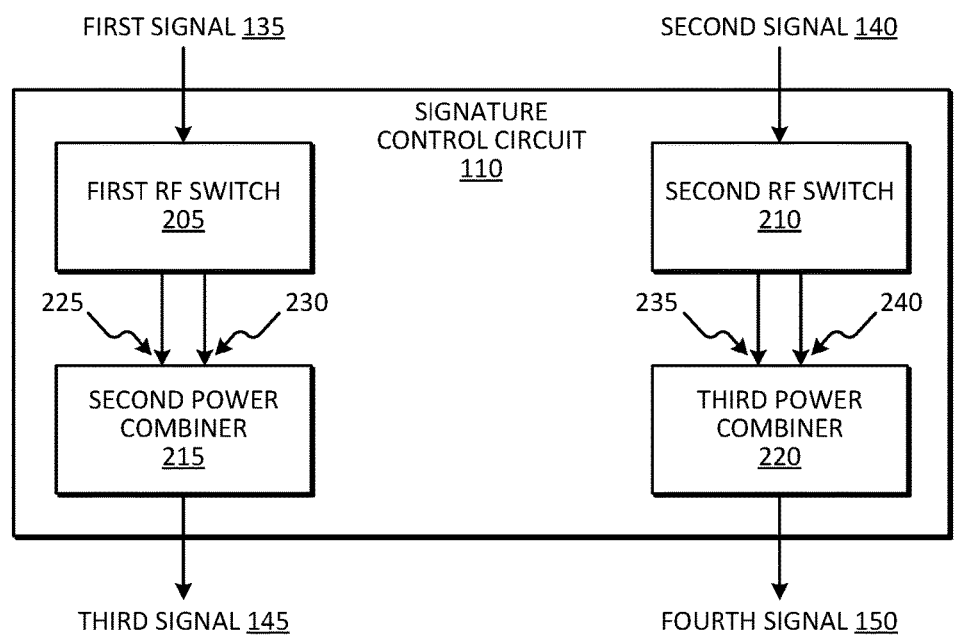
FIG. 2 is a diagram of a signature control circuit included in the RF Doppler emulator circuit of FIG. 1, in accordance with some embodiments.

FIG. 2 is a diagram of one example embodiment of the signature control circuit 110 included in the RF Doppler emulator circuit 100. In the embodiment illustrated in FIG. 2, the signature control circuit 110 includes a first RF switch 205, a second RF switch 210, a second power combiner 215, and a third power combiner 220. The second power combiner 215 includes a first input port 225 and the second input port 230. The third power combiner 220 includes a third input port 235 and a fourth input port 240. The signature control circuit 110 illustrated in FIG. 2 is provided as one example of such a circuit. In some embodiments, the signature control circuit 110 includes fewer or additional components in configurations different from the one illustrated in FIG. 2.

The first RF switch 205 is connected to the power splitter 105 such that the first RF switch 205 receives the first signal 135. The first RF switch 205 selectively routs the first signal 135 to either the first input port 225 of the second power combiner 215 or the second input port 230 of the second power combiner 215. In some embodiments, the first RF switch 205 includes a single-pole double-throw (SPDT) RF switch (for example, the VSWA2-63DR+ SPDT RF switch from Mini-Circuits™).

The second RF switch 210 is connected to the power splitter 105 such that the second RF switch 210 receives the second signal 140. The second RF switch 210 selectively routs the second signal 140 to either the third input port 235 of the third power combiner 220 or the fourth input port 240 of the third power combiner 220. In some embodiments, the second RF switch 210 includes a single-pole double-throw (SPDT) RF switch (for example, the VSWA2-63DR+ SPDT RF switch from Mini-Circuits™).

The second power combiner 215 generates the third signal 145 by shifting the phase of the first signal 135 either zero degrees or 180 degrees. In some embodiments, the second power combiner 215 shifts the phase of the first signal 135 by zero degrees when the first RF switch 205 routs the first signal 135 to the first input port 225. Alternatively, the second power combiner 215 shifts the phase of the first signal 135 by 180 degrees when the first RF switch 205 routs the first signal 135 to the second input port 230. In some embodiments, the second power combiner 215 includes a two-way 180 degree power combiner (for example, the SYPJ-2-222+two-way 180 degree power splitter/combiner from Mini-Circuits™).

The third power combiner 220 generates the fourth signal 150 by shifting the phase of the second signal 140 either zero degrees or 180 degrees. In some embodiments, the third power combiner 220 shifts the phase of the second signal 140 by zero degrees when the second RF switch 210 routs the second signal 140 to the third input port 235. Alternatively, the third power combiner 220 shifts the phase of the second signal 140 by 180 degrees when the second RF switch 210 routs the second signal 140 to the fourth input port 240. In some embodiments, the third power combiner 220 includes a two-way 180 degree power combiner (for example, the SYPJ-2-222+ two-way 180 degree power splitter/combiner from Mini-Circuits™).

The Doppler spread effect introduces a time varying scale on the transmitted RF signal while it passes through the RF Doppler emulator circuit 100. An example representation of the Doppler spread effect may be determined using equation (1).

$$y(t)=\alpha(t)x(t) \quad (1)$$

where
y(t)=RF output signal 165,
α(t)=time varying channel coefficient, and
x(t)=RF input signal 130.

The time varying channel coefficient in equation (1) can be rewritten with its real and imaginary components using equation (2).

$$\alpha(t)=\text{sign}\{\text{real}\{\alpha(t)\}\}\times|\text{real}(\alpha(t))|+j\,\text{sign}\{\text{imag}\{\alpha(t)\}\}\times|\text{imag}(\alpha(t))| \quad (2)$$

where
α(t)=time varying channel coefficient,
real(α(t))=real component of the time varying channel coefficient,
imag(α(t))=imaginary component of the time varying channel coefficient, and
j=imaginary number (i.e., $\sqrt{-1}$).

With the RF Doppler emulator circuit 100, the RF input signal 130 is divided into two paths by the power splitter 105 and combined by the first power combiner 125. This process reflects the real and imaginary terms in equation (2). In each path, the first RF switch 205 and the second RF switch 210 together with the second power combiner 215 and the third power combiner 220, introduce the signature of real and imaginary terms by adding a zero degree phase shift or a 180 degree phase shift. The absolute value in each term is applied with the first variable attenuator 115 and the second variable attenuator 120 by changing the loss in the path.

Figure 3:
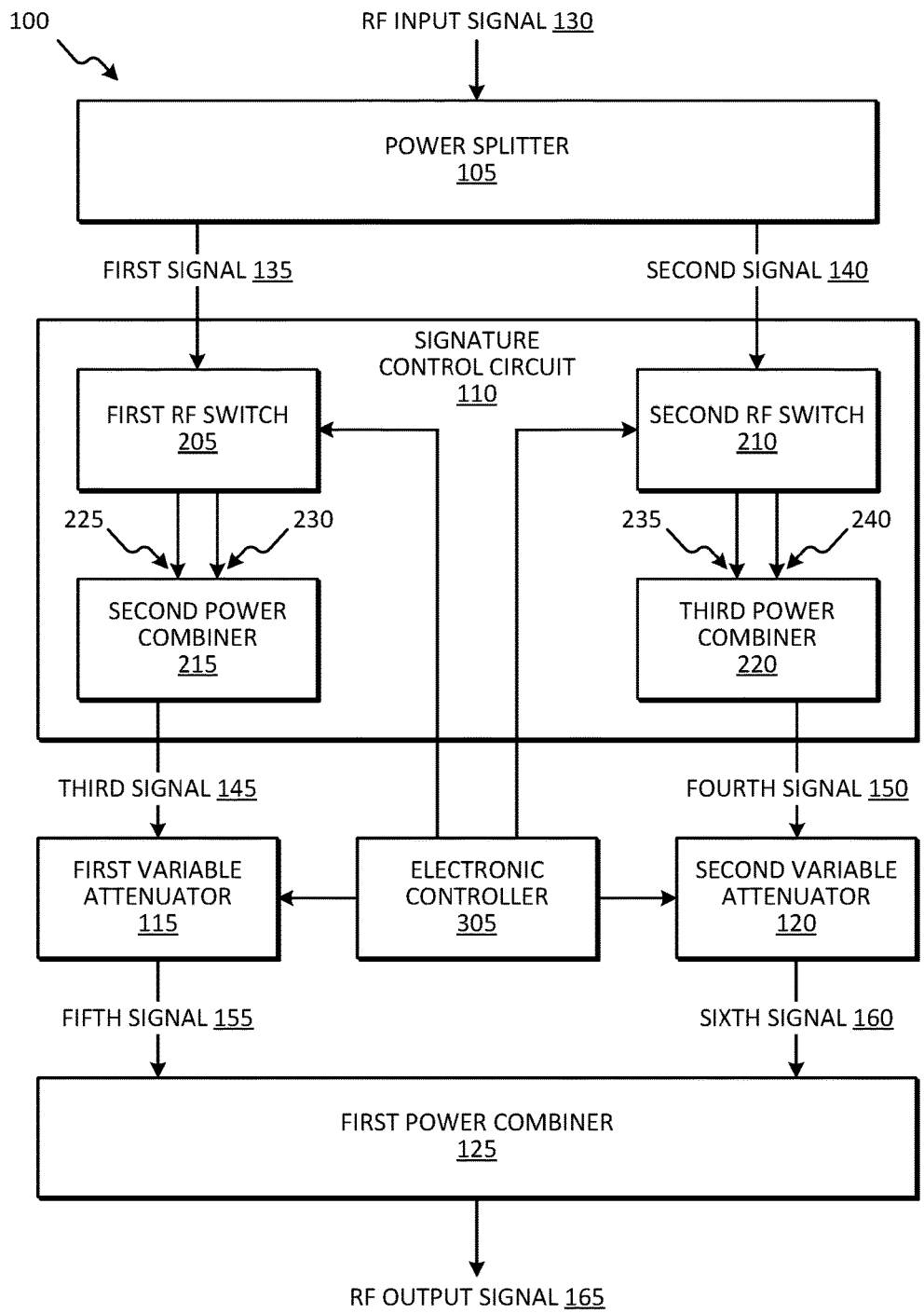
FIG. 3 is a diagram of an RF Doppler emulator circuit including an electronic controller, in accordance with some embodiments.

FIG. 3 is a diagram of one example embodiment of the RF Doppler emulator circuit 100 including an electronic controller 305. As described herein, the first RF switch 205 selectively routs the first signal 135 to either the first input port 225 or the second input port 230 of the second power combiner 215. In some embodiments, the electronic controller 305 is connected to the first RF switch 205 to supply control signals thereto. In such embodiments, the first RF switch 205 routs the first signal 135 to either the first input port 225 or the second input port 230 of the second power combiner 215 based on one or more control signals generated by the electronic controller 305. For example, the first RF switch 205 routs the first signal 135 to the first input port 225 when the voltage of the control signal is less than a threshold voltage of the first RF switch 205. Alternatively, the first RF switch 205 routs the first signal 135 to the second input port 230 when the voltage of the control signal is greater than the threshold voltage of the first RF switch 205. In some embodiments, the electronic controller 305 generates control signals for the first RF switch 205 based on the sign of the real component of the time varying channel coefficient. For example, the electronic controller 305 generates a control signal for the first RF switch 205 with a voltage that is greater than the threshold voltage of the first RF switch 205 when the sign of the real component of the time varying channel coefficient is positive. Alternatively, the electronic controller 305 generates a control signal for the first RF switch 205 with a voltage that is less than the threshold voltage of the first RF switch 205 when the sign of the real component of the time varying channel coefficient is negative. In other words, the control signals sent to the first RF switch 205 include the sign function (or signum function) of the real component of the time varying channel coefficient.

As described herein, the second RF switch 210 selectively routs the second signal 140 to either the third input port 235 or the fourth input port 240 of the third power combiner 220. In some embodiments, the electronic controller 305 is connected to the second RF switch 210 to supply control signals thereto. In such embodiments, the second RF switch 210 routs the second signal 140 to either the third input port 235 or the fourth input port 240 of the third power combiner 220 based on one or more control signals generated by the electronic controller 305. For example, the second RF switch 210 routs the second signal 140 to the third input port 235 when the voltage of the control signal is less than a threshold voltage of the second RF switch 210. Alternatively, the second RF switch 210 routs the second signal 140 to the fourth input port 240 when the voltage of the control signal is greater than the threshold voltage of the second RF switch 210. In some embodiments, the electronic controller 305 generates control signals for the second RF switch 210 based on the sign of the imaginary component of the time varying channel coefficient. For example, the electronic controller 305 generates a control signal for the second RF switch 210 with a voltage that is greater than the threshold voltage of the second RF switch 210 when the sign of the imaginary component of the time varying channel coefficient is positive. Alternatively, the electronic controller 305 generates a control signal for the second RF switch 210 with a voltage that is less than the threshold voltage of the second RF switch 210 when the sign of the imaginary component of the time varying channel coefficient is negative. In other words, the control signals sent to the second RF switch 210 include the sign function (or signum function) of the imaginary component of the time varying channel coefficient.

In some embodiments, changes in the states of the first RF switch 205 and the second RF switch 210, due to a signature change in the imaginary component or the real component of the time varying channel coefficient, can cause a distortion in the signal during rise time and fall time due to non-ideal characteristics of the first RF switch 205 and the second RF switch 210. Since the time varying channel coefficient is correlated in time, the amplitude can drop before any signature change which will reduce the power of aforementioned distortion to a negligible level.

The electronic controller 305 is connected to the first variable attenuator 115 to supply control signals thereto. In some embodiments, the electronic controller 305 generates a time sequence of control voltages for the first variable attenuator 115 which are determined using the voltage to attenuation transfer function of the first variable attenuator 115. In some embodiments, the electronic controller 305 generates control signals for the first variable attenuator 115 based on the real component of the time varying channel coefficient. For example, the electronic controller 305 may determine the attenuation value in each time instant as 20 $\log_{10}(|real(\alpha(t))|)$. In some embodiments, the determined attenuation values are increased by 10 decibels and clipped to work in the approximately linear part (for example, 8 decibels to 34 decibels) of the transfer function.

The electronic controller 305 is connected to the second variable attenuator to supply control signals thereto. In some embodiments, the electronic controller 305 generates a time sequence of control voltages for the second variable attenuator 120 which are determined using the voltage to attenuation transfer function of the second variable attenuator 120. In some embodiments, the electronic controller 305 generates control signals for the second variable attenuator 120 based on the imaginary component of the time varying channel coefficient. For example, in some embodiments, the electronic controller 305 may determine the attenuation value in each time instant as 20 $\log_{10}(|imag(\alpha(t))|)$. In some embodiments, the determined attenuation values are increased by 10 decibels and clipped to work in the approximately linear part (for example, 8 decibels to 34 decibels) of the transfer function.

Figure 4:
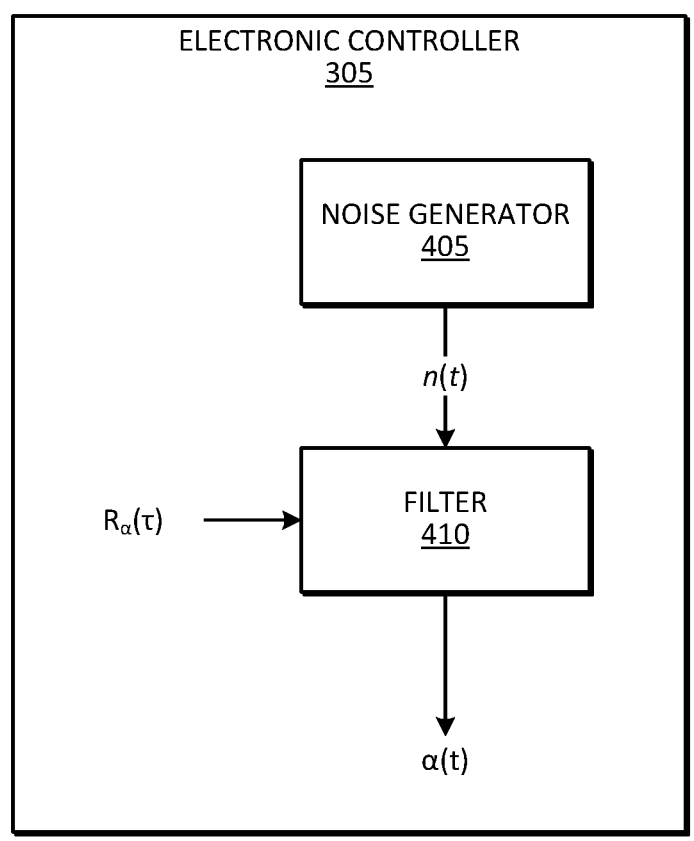
FIG. 4 is a diagram of the electronic controller included in FIG. 3, in accordance with some embodiments.

FIG. 4 is a diagram of one example embodiment of the electronic controller 305. In the embodiment illustrated in FIG. 4, the electronic controller 305 includes a noise generator 405 and a filter 410. As described above, the RF Doppler emulator circuit 100 generates the RF output signal 165 by multiplying the RF input signal 130 with the time varying channel coefficient. In the embodiment illustrated in FIG. 4, the electronic controller 305 determines the time varying channel coefficient by filtering a normally distributed complex noise sequence (for example, n(t)~N(0, 1)) with a desired correlation. In some embodiments, the desired correlation can be determined using equation (3).

$$R_\alpha(\tau) = IF\{S(f)\} \quad (3)$$

where
$R_\alpha$=desired correlation,
IF=inverse Fourier transform,
S=power spectral density,
f=frequency.

The power spectral density depends at least in part on mobility, environmental scatters of the transmitted RF signal, and the radiation pattern of the transmitter/receiver antenna. For air to ground communication, the power spectral density of the time varying channel coefficient can be determined using equation (4).

$$S(f) = \frac{G}{B\sqrt{\pi}} \exp\left(\frac{-(2f^2)}{B^2}\right) \quad (4)$$

where
S=power spectral density,
f=frequency,
G=path gain, and
B=Doppler bandwidth.

In some embodiment, the Doppler Bandwidth can be determined using equation (5).

$$B = 2f_c\left(\frac{v}{c}\right)\beta\sin\gamma \quad (5)$$

where
B=Doppler bandwidth,
$f_c$=carrier frequency,
c=speed of light,
β=root mean squared (RMS) surface slope (for example, 0.1 for a sea surface),
v=ground vehicle velocity, and
γ=elevation angle.

Figure 5:
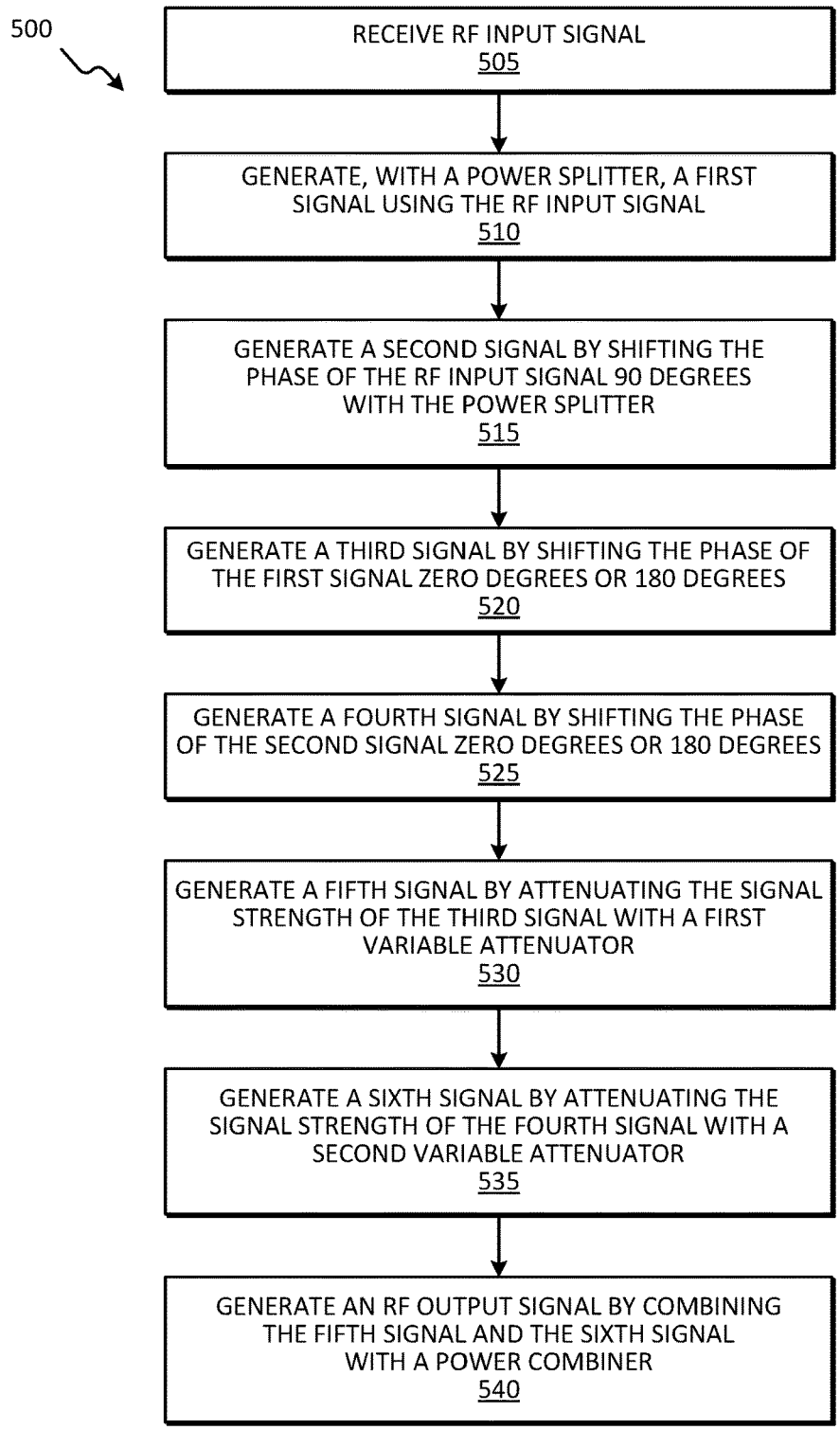
FIG. 5 is a flowchart of a method for emulating Doppler spread in the RF domain, in accordance with some embodiments.

FIG. 5 illustrates an example method 500 for emulating Doppler spread in an RF domain. The method 500 is described with respect to the RF Doppler emulator circuit 100 illustrated in FIGS. 1 through 4. However, it should be understood that in some embodiments, portions of the method 500 may be performed by other devices.

At block 505, the RF Doppler emulator circuit 100 receives the RF input signal 130. At block 510, the power splitter 105 generates the first signal 135 using the RF input signal 130. In some embodiments, the phase of the first signal 135 is substantially the same as the phase of the RF input signal 130. At block 515, the power splitter 105 generates the second signal 140 by shifting the phase of the RF input signal 130 by 90 degrees. At block 520, the signature control circuit 110 generates the third signal 145 (for example, with the first RF switch 205 and the second power combiner 215) by shifting the phase of the first signal 135 either zero degrees or 180 degrees. At block 525, the signature control circuit 110 generates the fourth signal 150 (for example, with the second RF switch 210 and the third power combiner 220) by shifting the phase of the second signal 140 either zero degrees or 180 degrees. At block 530, the first variable attenuator 115 generates the fifth signal 155 by attenuating the signal strength of the third signal 145. At block 535, the second variable attenuator 120 generates the sixth signal 160 by attenuating the signal strength of the fourth signal 150. At block 540, the first power combiner 125 generates the RF output signal 165 by combining the fifth signal 155 and the sixth signal 160.

The method 500 is described herein in an iterative manner. However, in some embodiments, different steps (or blocks) of the method 500 may be executed simultaneously or in parallel. For example, the signature control circuit 110 may generate the third signal 145 (at block 520) and the fourth signal 150 (at block 525) at the same time. As a further example, the first variable attenuator 115 may generate fifth signal 155 (at block 530) and the second variable attenuator 120 may generate the sixth signal 160 (at block 535) at the same time.

In general, phase unbalance of the power splitter 105 should be as low as possible, since it can disturb the signal when combined again in the first power combiner 125. In some embodiments, the power splitter 105 introduces a phase unbalance. For example, the power splitter 105 may introduce a maximum phase unbalance of 3.8 degrees at a frequency of 1.2 gigahertz. The error that can be caused by a phase unbalance of 3.8 degrees can be determined using equation (6).

$$\text{Error} = \alpha(t)\{1 - e^{j\pi 3.8/180}\} = -23.6 \text{ decibals} \quad (6)$$

where
α(t)=time varying channel coefficient, and
j=imaginary number (i.e., $\sqrt{-1}$).

In some embodiments, the RF Doppler emulator circuit 100 addresses this issue by increasing the lengths of the traces between the power splitter 105 and the first and second RF switches 205, 210. The increases in the lengths of the traces are large enough to introduce an additional 3.8 degree phase shift. In general, to keep the error below one percent of the desired signal, the phase unbalance should be less than 5.7 degrees.

In some embodiments the Doppler bandwidth introduced by the RF Doppler emulator circuit 100 is limited by the speed of an electronic processor included in some embodiments of the electronic controller 305. Using the Nyquist theorem, the relation between Doppler bandwidth and processor speed can be determines using equation (7).

$$B=2\times f_{control} \quad (7)$$

where
B=bandwidth, and
$f_{control}$=maximum possible speed to change each control signal.

Figure 6:
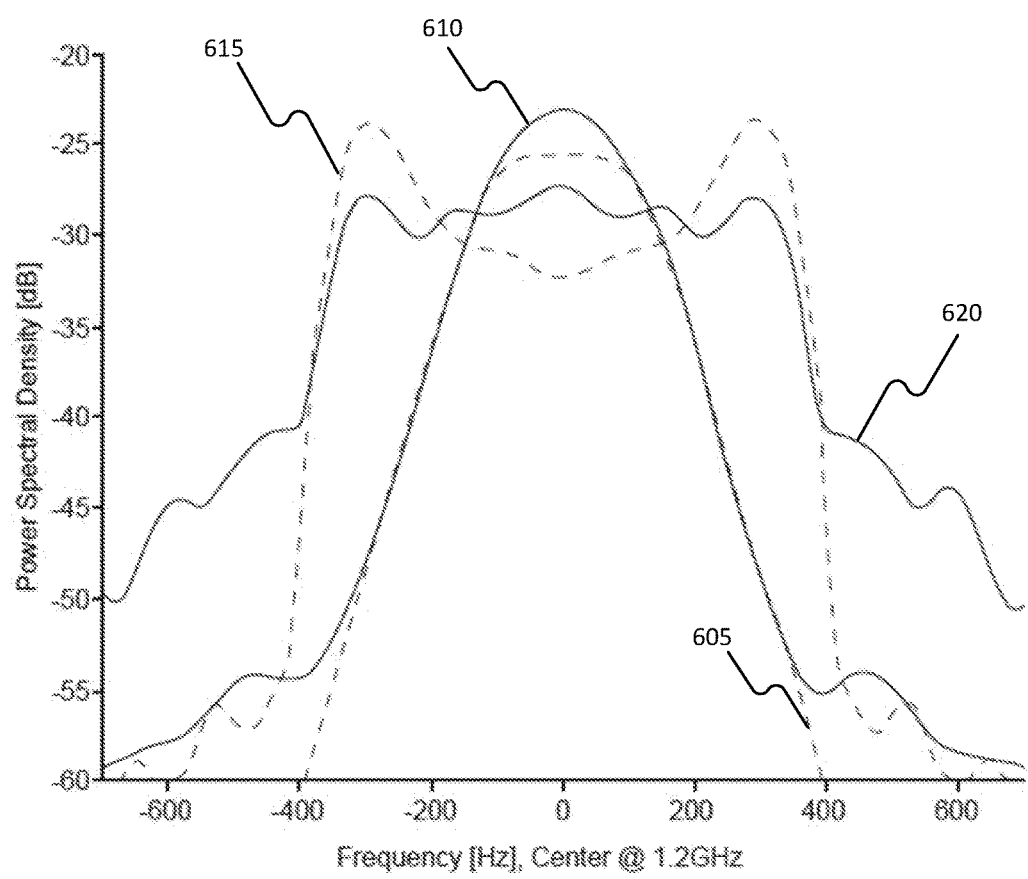
FIG. 6 is a graph of power spectral densities of the RF Doppler emulator circuit included in FIG. 3, in accordance with some embodiments.

In some embodiments, the RF Doppler emulator circuit 100 can be used for a frequency range between 0.82 gigahertz through 1.6 gigahertz. FIG. 6 illustrates example comparisons of the performance of the RF Doppler emulator circuit 100 for a Gaussian model and Jakes' model when an RF input signal 130 with a 1.2 gigahertz frequency is received by the RF Doppler emulator circuit 100. The graph in FIG. 6 includes a first power spectral density 605, a second power spectral density 610, a third power spectral density 615, and a fourth power spectral density 620. The first power spectral density 605 is a target power spectral density of predetermined coefficients using a Gaussian model. The second power spectral density 610 is a measured power spectral density generated by the RF Doppler emulator circuit 100 using a Gaussian model when an RF input signal 130 with a 1.2 gigahertz frequency is received by the RF Doppler emulator circuit 100. The third power spectral density 615 is a target power spectral density of predetermined coefficients using Jakes' model. The fourth power spectral density 620 is a measured power spectral density generated by the RF Doppler emulator circuit 100 using Jakes' model when an RF input signal 130 with a 1.2 gigahertz frequency is received by the RF Doppler emulator circuit 100. As illustrated in FIG. 6, the measured power spectral densities generated by the RF Doppler emulator circuit 100 match with the target power spectral densities for the Gaussian model and Jakes' model.

Figure 7:
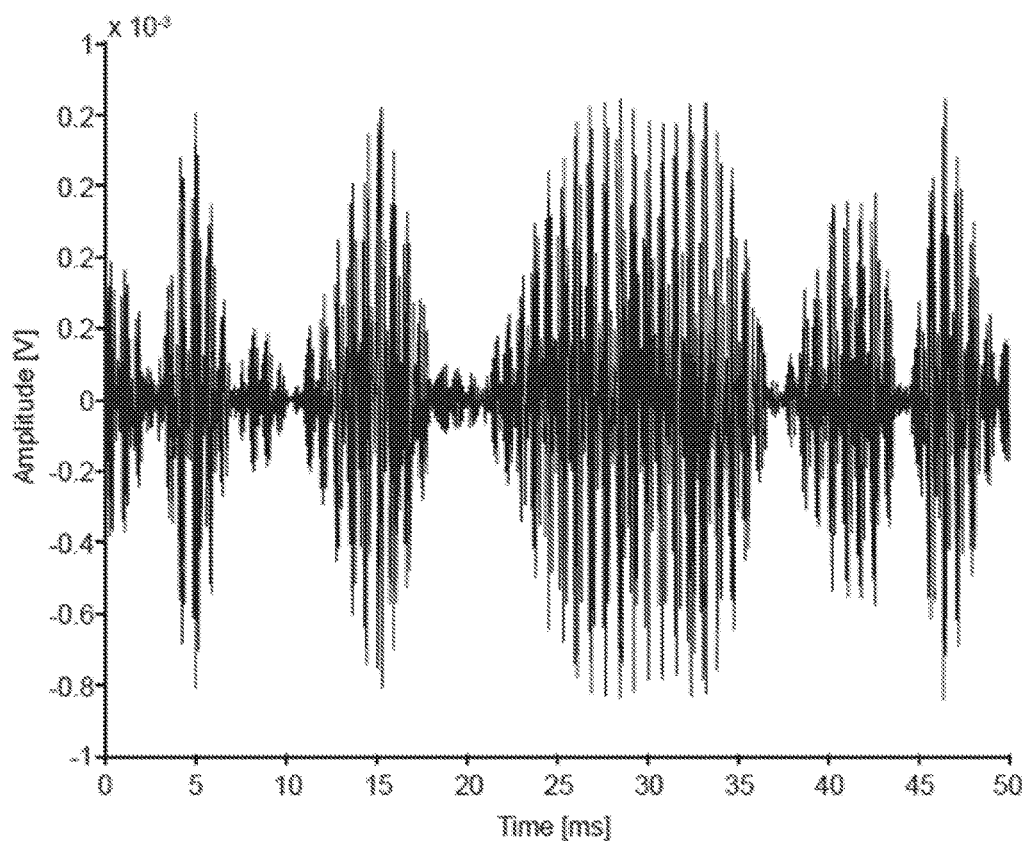
FIG. 7 is a graph of an in-phase component of a received time domain component, in accordance with some embodiments.

FIG. 7 shows the in-phase component of the received signal at radio frequency. As illustrated in FIG. 7, an unmodulated single tone input signal that is distorted by the RF Doppler emulator circuit 100 and the envelope is changing in time. The coherence time of the signal can be determined using equation (8).

$$T_c=9/(16 \cdot \pi \cdot B) \quad (8)$$

where
$T_c$=coherence time of the signal, and
B=bandwidth.

For example, 450 hertz of 10 decibels bandwidth from a desired power spectral density may yield at coherence time of 0.4 milliseconds. FIG. 7 validates these results as the time domain envelope changes in about 0.4 milliseconds.

Figure 8:
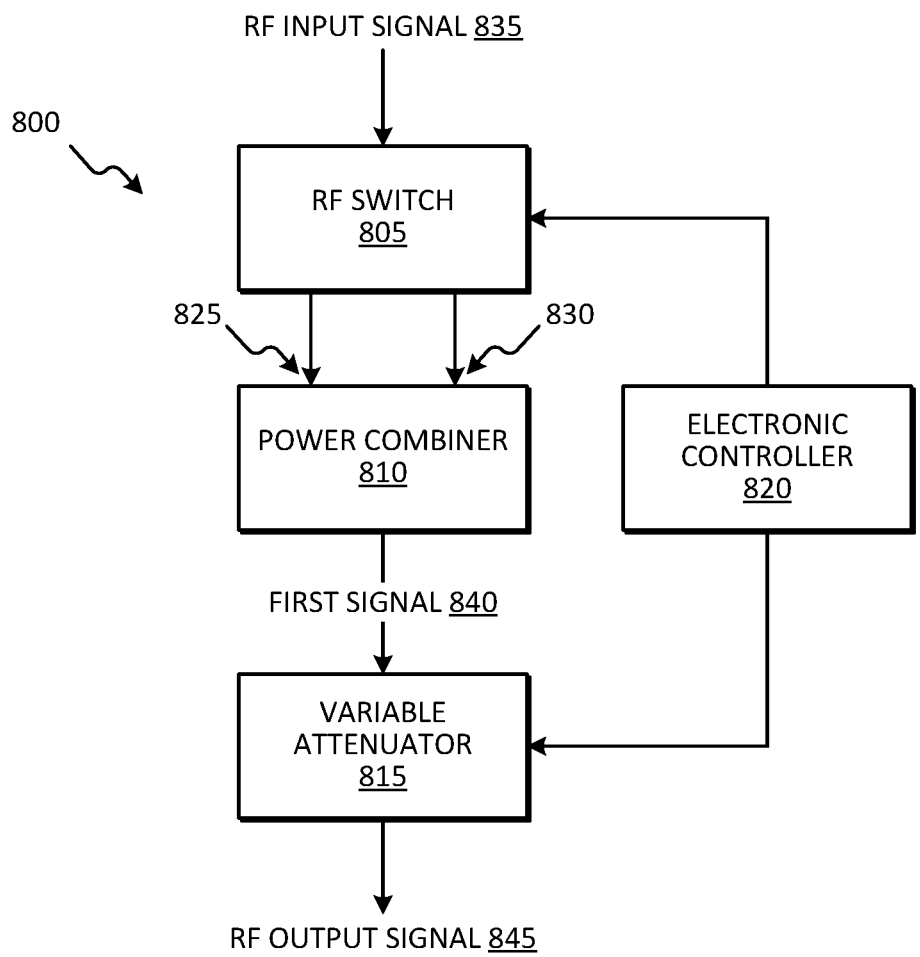
FIG. 8 is a diagram of an RF Doppler emulator circuit, in accordance with some embodiments.

FIG. 8 is a diagram of an example embodiment of an RF Doppler emulator circuit 800 for Doppler spreads with symmetrical shape. In the embodiment illustrated in FIG. 8, the RF Doppler emulator circuit 800 includes an RF switch 805, a power combiner 810, a variable attenuator 815, and an electronic controller 820. The power combiner 810 includes a first input port 825 and a second input port 830.

The RF Doppler emulator circuit 800 illustrated in FIG. 8 is provided as one example of such a circuit. In some embodiments, the RF Doppler emulator circuit 800 includes fewer or additional components in configurations different from the one illustrated in FIG. 8.

The RF switch 805 receives an RF input signal 835. The RF switch 805 selectively routs the RF input signal 835 to the first input port 825 or the second input port 830 of the power combiner 810. In some embodiments, the RF switch 805 includes a single-pole double-throw (SPDT) RF switch (for example, the VSWA2-63DR+ SPDT RF switch from Mini-Circuits™).

The power combiner 810 generates a first signal 840 by shifting the phase of the RF input signal 835 either zero degrees or 180 degrees. In some embodiments, the power combiner 810 shifts the phase of the RF input signal 835 by zero degrees when the RF switch 805 routs the RF input signal 835 to the first input port 825 of the power combiner 810. Alternatively, the power combiner 810 shifts the phase of the RF input signal 835 by 180 degrees when the RF switch 805 routs the RF input signal 835 to the second input port 850 of the power combiner 810. In some embodiments, the power combiner 810 includes a two-way 180 degree power combiner (for example, the SYPJ-2-222+ two-way 180 degree power splitter/combiner from Mini-Circuits™).

The variable attenuator 815 is connected to the power combiner 810 such that the variable attenuator 815 receives the first signal 840. The variable attenuator 815 generates an RF output signal 845 using the first signal 840. In some embodiments, the variable attenuator 815 generates the RF output signal 845 by attenuating the signal strength of the first signal 840. For example, the variable attenuator 815 generates the RF output signal 845 such that the signal strength of the RF output signal 845 is less than the signal strength of the first signal 840. In some embodiments, the variable attenuator 815 includes a voltage controlled attenuator (for example, the RFSA2013 voltage controlled attenuator from RFMD™).

The electronic controller 820 illustrated in FIG. 8 is connected to the RF switch 805 and the variable attenuator 815 to supply control signals thereto. In some embodiments, the RF switch 805 routs the RF input signal 835 to either the first input port 825 or the second input port 830 of the power combiner 810 based on one or more control signals generated by the electronic controller 820. For example, the RF switch 805 routs the RF input signal 835 to the first input port 825 when the voltage of the control signal is less than a threshold voltage of the RF switch 805. Alternatively, the RF switch 805 routs the RF input signal 835 to the second input port 830 when the voltage of the control signal is greater than the threshold voltage of the RF switch 805. In some embodiments, the electronic controller 820 generates a time sequence of control voltages for the variable attenuator 815 which are determined using the voltage to attenuation transfer function of the variable attenuator 815. In some embodiments, the electronic controller 820 generates the control signals based at least in part on a normally distributed complex noise sequence and a desired correlation. For example, the electronic controller 820 may generate the control signals by filtering a normally distributed complex noise sequence with a desired correlation.

Figure 9:
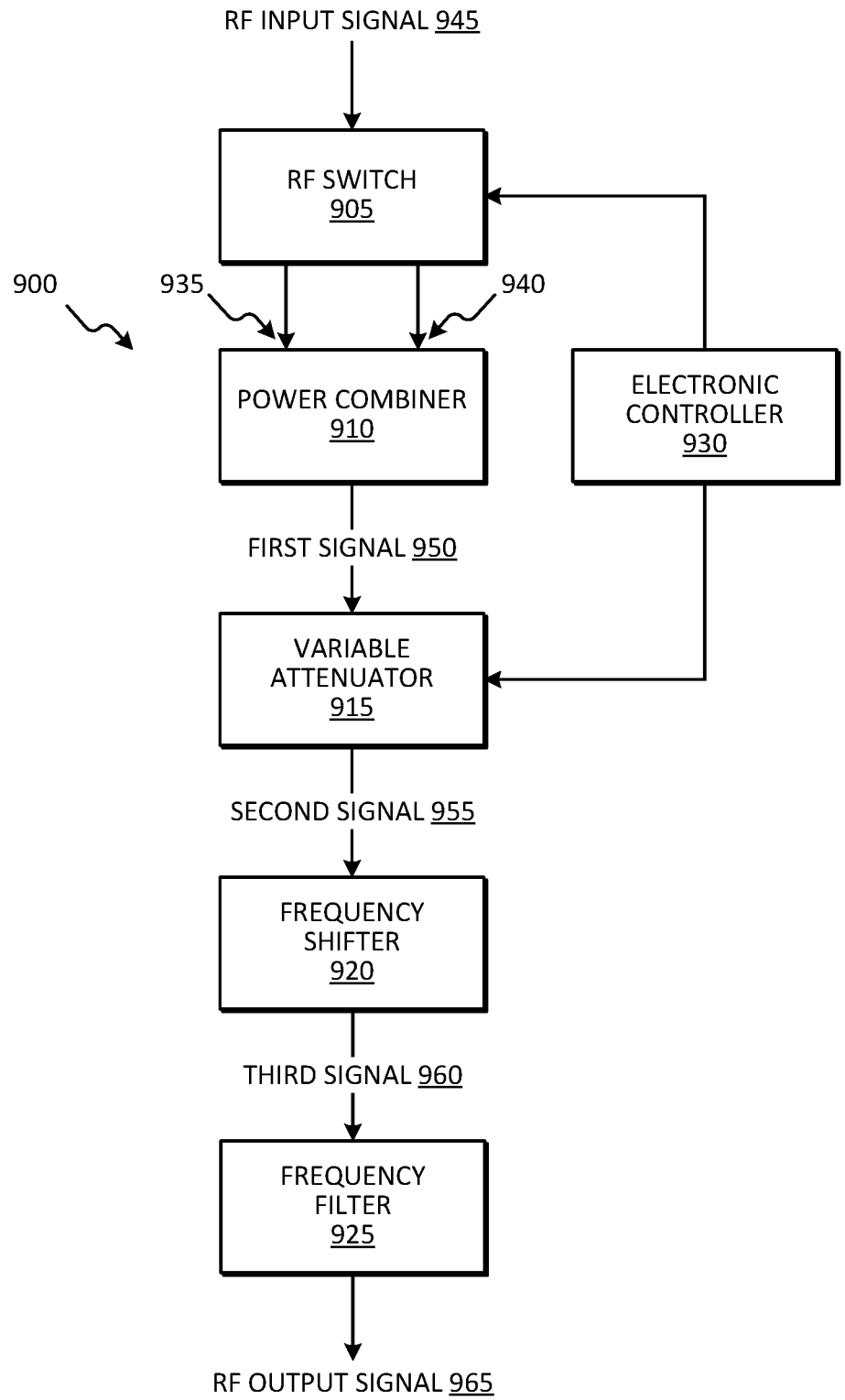
FIG. 9 is a diagram of an RF Doppler emulator circuit, in accordance with some embodiments.

FIG. 9 is a diagram of an example embodiment of an RF Doppler emulator circuit 900 for shifted Doppler spreads with symmetrical shape. In the embodiment illustrated in FIG. 9, the RF Doppler emulator circuit 900 includes an RF switch 905, a power combiner 910, a variable attenuator 915, a frequency shifter 920, a frequency filter 925, and an electronic controller 930. The power combiner 910 includes a first input port 935 and a second input port 940. The RF Doppler emulator circuit 900 illustrated in FIG. 9 is provided as one example of such a circuit. In some embodiments, the RF Doppler emulator circuit 900 includes fewer or additional components in configurations different from the one illustrated in FIG. 9.

The RF switch 905 receives an RF input signal 945. The RF switch 905 selectively routs the RF input signal 945 to the first input port 935 or the second input port 940 of the power combiner 910. In some embodiments, the RF switch 905 includes a single-pole double-throw (SPDT) RF switch (for example, the VSWA2-63DR+ SPDT RF switch from Mini-Circuits™).

The power combiner 910 generates a first signal 950 by shifting the phase of the RF input signal 945 either zero degrees or 180 degrees. In some embodiments, the power combiner 910 shifts the phase of the RF input signal 945 by zero degrees when the RF switch 905 routs the RF input signal 945 to the first input port 935 of the power combiner 910. Alternatively, the power combiner 910 shifts the phase of the RF input signal 945 by 180 degrees when the RF switch 905 routs the RF input signal 945 to the second input port 940 of the power combiner 910. In some embodiments, the power combiner 910 includes a two-way 180 degree power combiner (for example, the SYPJ-2-222+ two-way 180 degree power splitter/combiner from Mini-Circuits™).

The variable attenuator 915 is connected to the power combiner 910 such that the variable attenuator 915 receives the first signal 950. The variable attenuator 915 generates a second signal 955 using the first signal 950. In some embodiments, the variable attenuator 915 generates the second signal 955 by attenuating the signal strength of the first signal 950. For example, the variable attenuator 915 generates the second signal 955 such that the signal strength of the second signal 955 is less than the signal strength of the first signal 950. In some embodiments, the variable attenuator 915 includes a voltage controlled attenuator (for example, the RFSA2013 voltage controlled attenuator from RFMD™).

The frequency shifter 920 is connected to the variable attenuator 915 such that the frequency shifter 920 receives the second signal 955. The frequency shifter 920 generates a third signal 960 using the second signal 955. In some embodiments, the frequency shifter 920 generates the third signal 960 by shifting the frequency of the second signal 955.

The frequency filter 925 is connected to the frequency shifter 920 such that the frequency filter 925 receives the third signal 960. The frequency filter 925 generates an RF output signal 965 using the third signal 960. In some embodiments, the frequency filter 925 generates the RF output signal 965 by filtering the third signal 960 with a bandpass filter.

The electronic controller 930 illustrated in FIG. 9 is connected to the RF switch 905 and the variable attenuator 915 to supply control signals thereto. In some embodiments, the RF switch 905 routs the RF input signal 945 to either the first input port 935 or the second input port 940 of the power combiner 910 based on one or more control signals generated by the electronic controller 930. For example, the RF switch 905 routs the RF input signal 945 to the first input port 935 when the voltage of the control signal is less than a threshold voltage of the RF switch 905. Alternatively, the RF switch 905 routs the RF input signal 945 to the second input port 940 when the voltage of the control signal is greater than the threshold voltage of the RF switch 905. In some embodiments, the electronic controller 930 generates a time sequence of control voltages for the variable attenuator 915 which are determined using the voltage to attenuation transfer function of the variable attenuator 915. In some embodiments, the electronic controller 930 generates the control signals based at least in part on a normally distributed complex noise sequence and a desired correlation. For example, the electronic controller 930 may generate the control signals by filtering a normally distributed complex noise sequence with a desired correlation.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 20%, in another embodiment within 10%, in another embodiment within 2% and in another embodiment within 1%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

What is claimed is:

1. A radio frequency (RF) Doppler emulator circuit comprising:
   a power splitter configured to
      receive an RF input signal,
      generate a first signal using the RF input signal, and
      generate a second signal using the RF input signal, wherein a first phase difference between the second signal and the first signal is 90 degrees;
   a signature control circuit configured to
      generate a third signal using the first signal, wherein a second phase difference between the third signal and the first signal is zero degrees or 180 degrees, and
      generate a fourth signal using the second signal, wherein a third phase difference between the fourth signal and the second signal is zero degrees or 180 degrees;
   a first variable attenuator configured to generate a fifth signal using the third signal, wherein a signal strength of the fifth signal is less than a signal strength of the third signal;
   a second variable attenuator configured to generate a sixth signal using the fourth signal, wherein a signal strength of the sixth signal is less than a signal strength of the fourth signal; and
   a power combiner configured to generate an RF output signal by combining the fifth signal and the sixth signal.

2. The RF Doppler emulator circuit of claim 1, wherein the power combiner is a first power combiner, wherein the signature control circuit including
   a second power combiner having a first input port and a second input port, and
   a first RF switch configured to rout the first signal to the first input port or the second input port,
   wherein the second phase difference between the third signal and the first signal is zero degrees when the first RF switch routs the first signal to the first input port, and wherein the second phase difference between the third signal and the first signal is 180 degrees when the first RF switch routs the first signal to the second input port.

3. The RF Doppler emulator circuit of claim 2, wherein the signature control circuit including
   a third power combiner having a third input port and a fourth input port, and
   a second RF switch configured to rout the second signal to the third input port or the fourth input port,
   wherein the third phase difference between the fourth signal and the second signal is zero degrees when the second RF switch routs the second signal to the third input port, and wherein the third phase difference between the fourth signal and the second signal is 180 degrees when the second RF switch routs the second signal to the fourth input port.

4. The RF Doppler emulator circuit of claim 2, wherein a signal trace between the power splitter and the first RF switch introduces a phase shift of at least 3.8 degrees to the first signal.

5. The RF Doppler emulator circuit of claim 2, wherein the first RF switch is configured to rout the first signal to the first input port or the second input port based on a control signal, wherein the RF Doppler emulator circuit further comprises an electronic controller configured to generate the control signal based on a normally distributed complex noise sequence and a desired correlation.

6. The RF Doppler emulator circuit of claim 1, wherein the first variable attenuator is configured to generate the fifth signal based on a control signal, wherein the RF Doppler emulator circuit further comprises an electronic controller configured to generate the control signal based on a normally distributed complex noise sequence and a desired correlation.

7. A method for emulating Doppler spread in a radio frequency (RF) domain, comprising:
   receiving an RF input signal at a power splitter;
   generating, with the power splitter, a first signal using the RF input signal;
   generating a second signal by shifting a phase of the RF input signal by 90 degrees with the power splitter;
   generating a third signal by shifting a phase of the first signal by zero degrees or 180 degrees;
   generating a fourth signal by shifting a phase of the second signal by zero degrees or 180 degrees;
   generating a fifth signal by attenuating a signal strength of the third signal with a first variable attenuator;
   generating a sixth signal by attenuating a signal strength of the fourth signal with a second variable attenuator; and
   generating an RF output signal by combining the fifth signal and the sixth signal with a power combiner.

8. The method of claim 7, wherein generating the third signal includes
   routing the first signal, with a first RF switch, to a first input port of a second power combiner or a second input port of the second power combiner; and
   generating, with the second power combiner, the third signal by shifting the phase of the first signal by zero degrees or 180 degrees,
   wherein a first phase difference between the third signal and the first signal is zero degrees when the first RF switch routs the first signal to the first input port, and wherein the first phase difference between the third signal and the first signal is 180 degrees when the first RF switch routs the first signal to the second input port.

9. The method of claim 8, wherein generating the fourth signal includes
   routing the second signal, with a second RF switch, to a third input port of a third power combiner or a fourth input port of the third power combiner; and
   generating, with the third power combiner, the fourth signal by shifting the phase of the second signal by zero degrees or 180 degrees,
   wherein a second phase difference between the fourth signal and the second signal is zero degrees when the second RF switch routs the second signal to the third input port, and wherein the second phase difference between the fourth signal and the second signal is 180 degrees when the second RF switch routs the second signal to the fourth input port.

10. The method of claim 8, further comprising
   generating a control signal, with an electronic controller, based on a normally distributed complex noise sequence and a desired correlation; and
   routing the first signal, with the first RF switch, to the first input port or the second input port based on the control signal.

11. The method of claim 7, further comprising
generating a control signal, with an electronic controller, based on a normally distributed complex noise sequence and a desired correlation; and
generating, with the first variable attenuator, the fifth signal based on the control signal.

* * * * *